Figure 1:
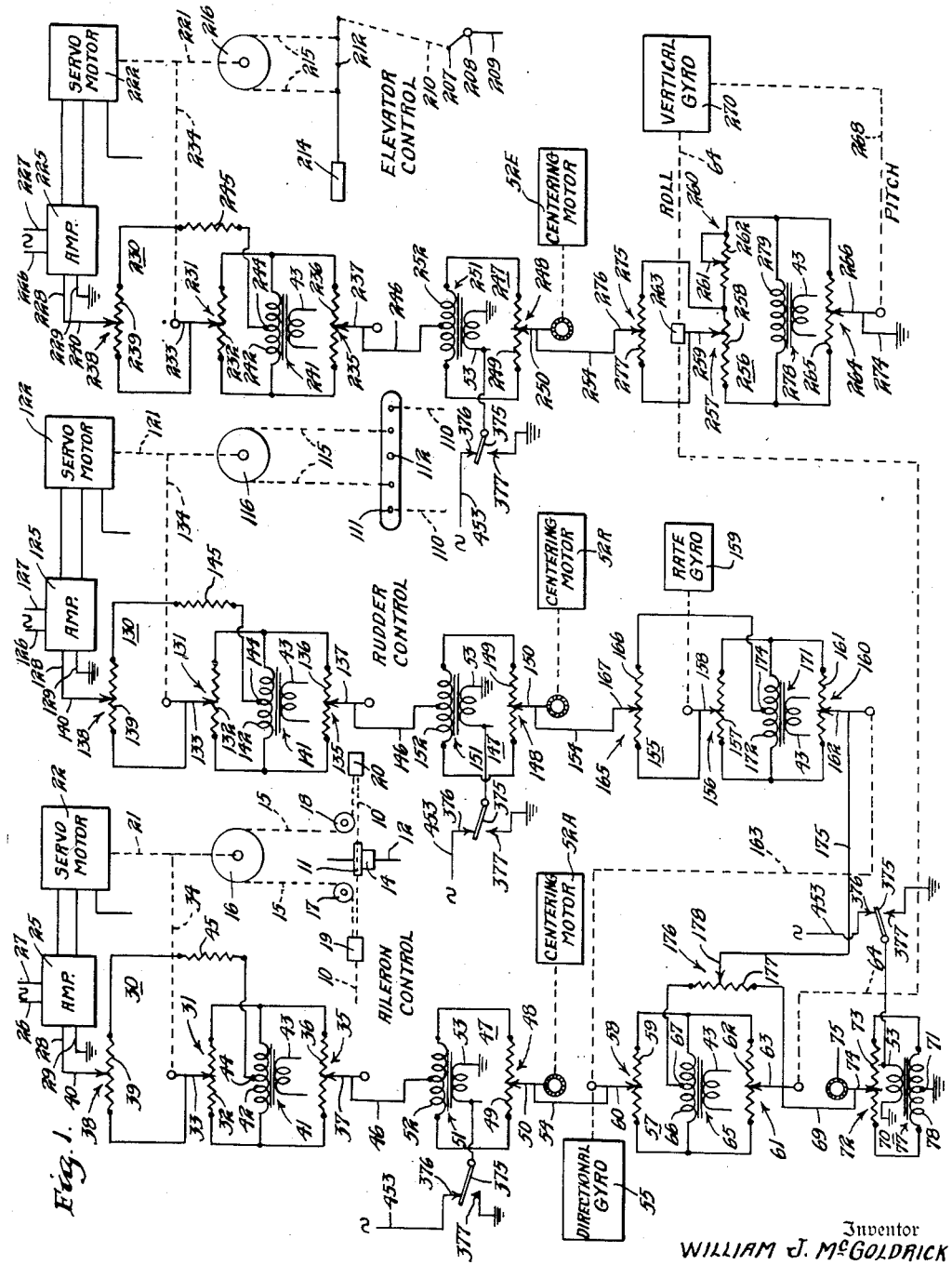

Oct. 13, 1953  W. J. McGOLDRICK  2,655,327
CONTROL APPARATUS FOR AIRCRAFT
Filed June 7, 1948  2 Sheets-Sheet 1

Inventor
WILLIAM J. McGOLDRICK
By
George H. Fisher
Attorney

Oct. 13, 1953   W. J. McGOLDRICK   2,655,327
CONTROL APPARATUS FOR AIRCRAFT
Filed June 7, 1948   2 Sheets-Sheet 2
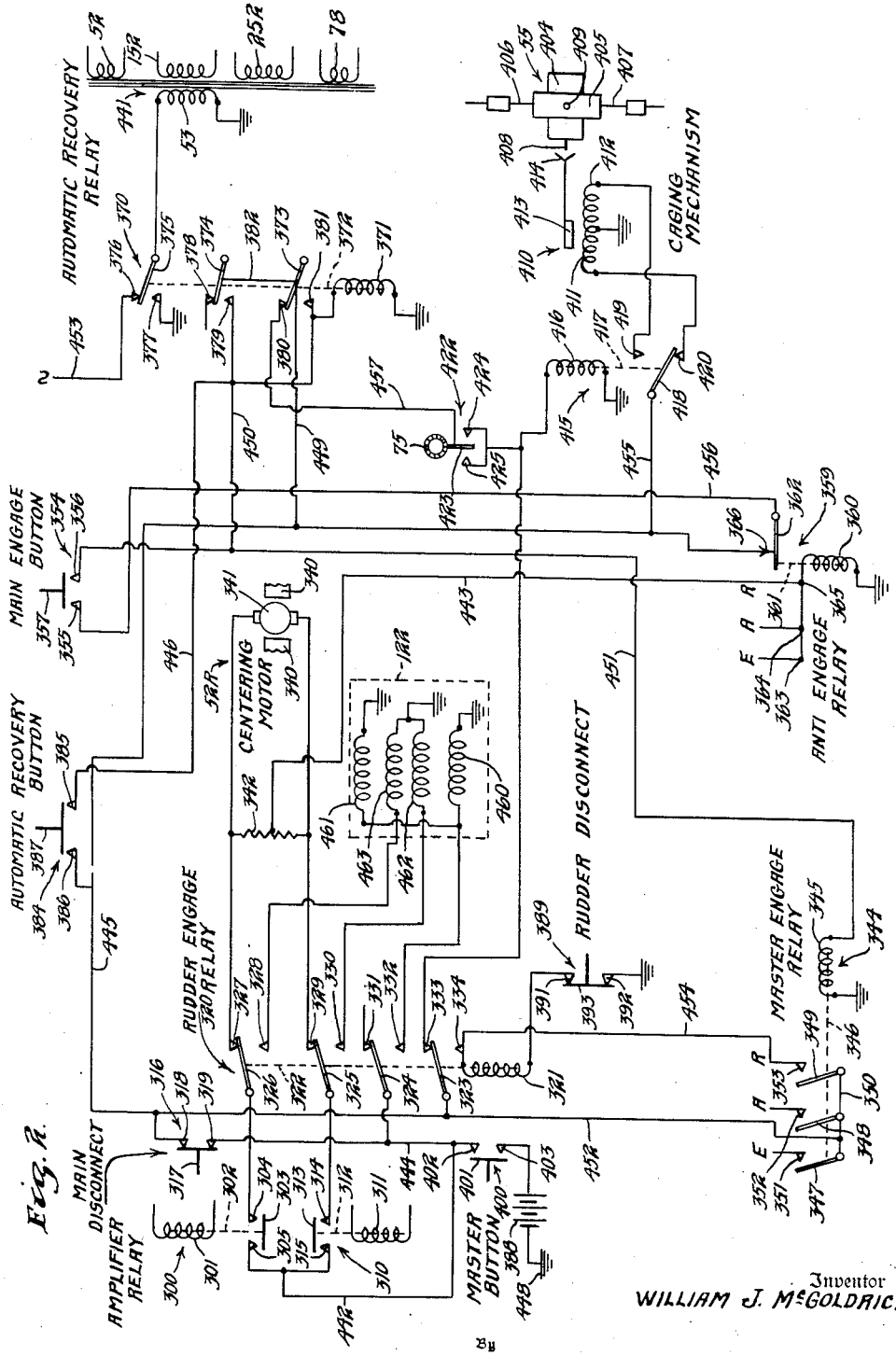
Inventor
WILLIAM J. McGOLDRICK
By
George H. Fisher
Attorney Patented Oct. 13, 1953

2,655,327

UNITED STATES PATENT OFFICE 2,655,327

CONTROL APPARATUS FOR AIRCRAFT

William J. McGoldrick, Edina, Minn., assignor to Minneapolis-Honeywell Regulator Company, Minneapolis, Minn., a corporation of Delaware Application June 7, 1948, Serial No. 31,493

6 Claims. (Cl. 244—77)

This invention pertains to automatic steering mechanisms for aircraft which mechanisms are generally known as automatic pilots.

An automatic pilot may be associated with control surfaces of an aircraft which control surfaces are also capable of being manually actuated. Such automatic pilots generally include a responsive device for sensing yaw of the aircraft or change in heading of the aircraft with respect to its vertical axis and a responsive device for sensing roll and pitch of the aircraft from a datum position. When the aircraft is controlled by the automatic pilot, these responsive devices control the operation of the control surfaces to maintain the aircraft in the datum position. While the control surfaces are manually actuated to alter the position of the craft from datum, the responsive devices although capable of sensing changes from datum do not control the control surfaces.

If the automatic pilot is connected to the control surfaces after the aircraft is so displaced from datum by the operation of the controls manually, the responsive devices in sensing the change in datum would restore the aircraft to datum despite any desire on the part of the operator to maintain the aircraft in its displaced attitude. To counteract this tendency on the part of the autopilot to return the aircraft to datum, it has been proposed to oppose the effect of each responsive device in said automatic pilot by a balancing signal while the control surfaces may be manually actuated so that the automatic pilot is at all times in the state of equilibrium. Therefore, if the automatic pilot be subsequently connected to the control surfaces with the aircraft changed from datum position, this changed position will be automatically maintained by the autopilot.

Instances have occurred, however, when the aircraft was being manually controlled, where it was desirable to automatically return the aircraft to its datum position. Such instances may arise where the pilot, while manually actuating the control surfaces, has become confused and does not know how to return the aircraft to datum directly. Other instances may develop where the operator of the control surfaces is suddenly aware that he is becoming disabled for further operation of the control surfaces. The operator in sensing his condition anticipates that he will not be able to return the aircraft to datum position.

To provide for the above and similar contingencies, it is an object of my invention to provide an improved automatic steering mechanism for an aircraft which may be connected to the control surfaces of said aircraft while the aircraft is in any one of various attitudes and which mechanism will maintain the aircraft in said attitude. However, this mechanism also includes a manually operable controller which may be operated in an unlimited or unprecise manner for automatically effecting return of the aircraft to a datum position irrespective of the current attitude of the aircraft.

It is a further object of my invention to provide such steering mechanism with manually adjustable control devices for altering the attitude of the aircraft through said mechanism about a plurality of axes but which devices as adjusted are rendered ineffective in said mechanism upon operation of said manually operable controller whereby the attitude of the aircraft is restored to a predetermined attitude.

The above and further objects of my invention will appear upon consideration of the following description and drawings illustrating a preferred embodiment of my invention.

In the drawings: Figure 1 is a diagrammatic arrangement of the association of operative parts of my steering mechanism during automatic control of an aircraft.

Figure 2 illustrates a portion of the steering mechanism associated with the operation of the rudder of an aircraft whereby the rudder power means may be connected or disconnected from said rudder.

Referring to Figure 1, there is illustrated therein an automatic steering mechanism for an aircraft having an aileron control for regulating the movements of the aircraft about the roll axis, a rudder control for regulating the movements of the aircraft about the yaw axis, and an elevator control for regulating the movements of the aircraft about the pitch axis. The aileron control includes main aileron cables 10 which are connected to ailerons not shown of the aircraft. The opposite ends of the cables 10 may as is conventional lie in separate grooves of a double grooved pulley 11 and may be secured therein to the pulley. The pulley 11 is fixed to a shaft 12 which may be suitably mounted in bearings carried by the aircraft. A manually operable control "stick," a portion 14 of which is shown, is carried by the shaft 12. It will be evident that upon rotation of the shaft 12 by the rocking of the stick 14 from one side to the other that the main aileron cables 10 may actuate the ailerons in well known manner. In the present arrangement as in similar automatic steering mechanisms, control of an aircraft is effected by operating the ailerons, rudder, and elevator. The operation is accomplished by motor or power means. Power operation of the ailerons is effected by cables 15 which extend from a servomotor cable drum 16. One cable 15 extends from the drum 16 through a guide pulley 17 to a suitable clamping means 19 which secures it to one main aileron cable 10. The opposite cable 15 extends from drum 16 and through a guide pulley 18 to a suitable clamp 20 which secures it to the other aileron cable 10. Cables 10 may alternatively by operated by a manually operable control stick pivoted on axis 12. The cable drum 16 is carried by a servomotor shaft 21 operated by servomotor 22. The servomotor 22 is controlled by an amplifier 25. The amplifier 25 is provided with power input leads 26 and 27 connected to a suitable source of alternating current such as an inverter (not shown). The amplifier 25 is also provided with signal input connections 28 and 29. The direction of rotation of servomotor 22 depends upon the phase relationship between the alternating voltages across signal input terminals 28, 29 and across the power input connections 26, 27. The amplifier-servomotor combination may be of the type disclosed in an application of Willis H. Gille, 447,989, filed June 22, 1942.

The signal input leads 28, 29 of amplifier 25 are connected to a balanceable control circuit comprising variable impedance network 30, lead 46, variable impedance network 47, lead 54, variable impedance network 57, lead 69, variable impedance network 70, lead 71 to ground, and to grounded lead 29 of amplifier 25.

The variable impedance network 30 consists of a servo-balance potentiometer 31, an automatic recovery potentiometer 35, a voltage dividing potentiometer 38, and a transformer 41. Potentiometer 31 includes a resistor 32 which is connected across the ends of a secondary winding 42 of transformer 41. Potentiometer 31 includes a wiper 33 which is operated from the servomotor shaft 21 through a suitable operating connection 34. The voltage dividing potentiometer 38 has a resistor 39 which has one end connected to wiper 33 of potentiometer 31 and has its other end connected in series with a loading resistor 45 to a center tap 44 of secondary winding 42 of transformer 41. Potentiometer 38 includes a manually adjustable tap 40 which is connected to lead 28 extending from amplifier 25. Potentiometer 35 has a resistor 36 which is connected across the ends of secondary winding 42 in parallel with resistor 32 of potentiometer 31. A wiper 37 of potentiometer 35 may be manually adjusted over the surface of resistor 36. Transformer 41 includes a primary winding 43 which may be connected to the suitable source of alternating current.

Impedance network 47 consists of a centering potentiometer 48 and a transformer 51. A resistor 49 of potentiometer 48 is connected across the ends of a secondary winding 52 of transformer 51. Potentiometer 48 includes an adjustable wiper 50 which may contact the surface of resistor 49. The wiper 50 is operated either manually or by means of a centering motor 52A to be described. Transformer 51 includes a primary winding 53. Lead 46 extends from wiper 37 of potentiometer 35 to a center tap of secondary winding 52 of transformer 51.

Impedance network 57 consists of a directional gyro aileron potentiometer 58, a vertical gyro roll axis potentiometer 61, and a transformer 65. Potentiometer 58 includes a resistor 59 which is connected across the ends of a secondary winding 66 of transformer 65 and a wiper 60 movable over the surface of resistor 59 and operated from a deviation responsive device illustrated as a directional gyro 55. The directional gyro 55 which will be described later operates the wiper 60 with respect to resistor 59 in proportion to the deviation of the aircraft from a desired heading. The potentiometer 61 consists of a resistor 62 whose ends are connected across the ends of secondary winding 66 in parallel with resistor 59 and a wiper 63 which is operated through a suitable connection 64 from a vertical gyro to be described. Transformer 65 is indicated as having a primary winding 43 which is common to the transformers 41 and 51. Lead 54 extends from wiper 50 to wiper 60 of the directional gyro aileron potentiometer 58.

Impedance network 70 consists of a turn control potentiometer 72 and a transformer 77. Potentiometer 72 has a resistor 73 which is connected across the ends of a secondary winding 78 of transformer 77 and a manually adjustable wiper 74 which is operated by the manually operable turn control knob 75. Transformer 77 includes a primary winding 53 which is common to the transformer 51 of network 47. Lead 69 extends from wiper 63 of potentiometer 61 to wiper 74 of potentiometer 72. Lead 71 extends from a center tap of secondary winding 78 of transformer 77 to ground. The return to the amplifier is through grounded lead 29 connected thereto.

The rudder not shown of the aircraft may be operated from cables 110 extending from a manually operable rudder bar 111 which is pivoted at 112 to the aircraft. Power operation of the rudder bar 111 may be effected by cables 115 extending from a servomotor cable drum 116. The drum 116 is carried by a shaft 121 which is driven by servomotor 122. The servomotor 122 has its operation controlled by an amplifier 125. The amplifier 125 and the servomotor 122 may be identical with the amplifier 25 and the servomotor 22 of the aileron control. Power input terminals 126, 127 of amplifier 125 are connected to the suitable source of alternating voltage. Amplifier 125 is provided with signal input terminals not shown which are connected to input leads 128, 129. The direction of rotation of servomotor 122 depends upon the phase relationship between the voltage across the input leads 128, 129 and the voltage across power input leads 126, 127. An input control signal circuit comprising a balanceable network extends from lead 128, variable impedance network 130, lead 146, variable impedance network 147, lead 154, variable impedance network 155, lead 175, voltage dividing potentiometer 176, lead 69, variable impedance network 70, lead 71 to ground, and to the grounded lead 129 of amplifier 125.

The impedance network 130 includes a servo-balance potentiometer 131, an automatic recovery potentiometer 135, a voltage dividing or trimmer potentiometer 138, and a transformer 141. Potentiometer 131 includes a resistor 132 whose ends are connected across the ends of a secondary winding 142 of transformer 141. Potentiometer 131 includes an adjustable wiper 133 which contacts the surface of resistor 132 and is operated through a suitable connection 134 from the servomotor shaft 121. The automatic recovery potentiometer 135 has a resistor 136 whose ends are connected across the ends of secondary winding 142 in parallel with resistor 132 and a manually adjustable wiper 137 which contacts the surface of resistor 136. Trimmer potentiometer 138 has a resistor 139 having one end connected to wiper 133 of potentiometer 131 and having its other end connected in series with a loading resistor 145 to a center tap 144 of secondary winding 142. A manually adjustable tap 140 of potentiometer 138 is connected through lead 128 to amplifier 125. The transformer 141 consists of the secondary winding 142 and a primary winding 43.

Variable impedance network 147 consists of a centering potentiometer 148 and a transformer 151. Potentiometer 148 has a resistor 149 whose ends are connected across the ends of a secondary winding 152 of transformer 151. Potentiometer 148 includes a wiper 150 which contacts the surface of resistor 149 and the point of contact may be varied by manually operating the wiper 150 or operating it from a centering motor 52R which is similar to centering motor 52A of the aileron control. Transformer 151 includes a primary winding 53. A lead 146 extends from wiper 137 of potentiometer 135 to a center tap of secondary winding 152 of transformer 151.

Variable impedance network 155 includes a yaw rate gyro potentiometer 156, a directional gyro rudder potentiometer 160, a voltage dividing or trimmer potentiometer 165, and a transformer 171. Potentiometer 156 has a resistor 157 whose ends are connected across the ends of a secondary winding 172 of transformer 171 and a wiper 158 which may be operated over the surface of resistor 157. Operation of wiper 158 is effected by a yaw rate gyro 159. The rate gyro 159 measures the angular speed of the aircraft about the vertical or yaw axis. This gyro 159 is of the conventional type whose rotor is mounted with two degrees of angular freedom and which movement is further restricted about one axis by spring restraining means. The gyro 159 may be similar to the gyro disclosed in United States Patent 2,190,390 for measuring the angular speed about the normal axis. Potentiometer 160 has a resistor 161 which has its ends connected across the ends of secondary winding 172 in parallel with resistor 157 and a wiper 162 which may be operated over the surface of resistor 161 by an operating connection 163 extending from directional gyro 55. Potentiometer 165 has a resistor 166 having one end connected to wiper 158 of the rate gyro potentiometer 156 and having its other end connected to a center tap 174 of secondary winding 172 of transformer 171. A manually adjustable tap 167 of potentiometer 165 is connected by means of lead 154 to the wiper 150 of centering potentiometer 148. The transformer 171 consists of the secondary winding 172 and a primary winding 43.

Voltage dividing potentiometer 176 has a resistor 177 and an adjustable tap 178. One end of resistor 177 is connected to center tap 67 of secondary winding 66 of transformer 65 of network 57 and the other end of resistor 177 is connected to wiper 63 of the vertical gyro aileron potentiometer 61. A lead 175 extends from adjustable tap 178 to wiper 162 of the directional gyro rudder potentiometer 160.

The remaining impedance network 70 of the input control circuit of amplifier 125 is common with the input control circuit of amplifier 25 and has been previously described in connection therewith. To complete the rudder amplifier signal circuit, lead 69 extends from wiper 63 of the vertical gyro aileron potentiometer 61 to wiper 74 of the turn control potentiometer 72, and lead 71 extends from a center tap of secondary winding 78 to ground and through ground to input connection 129 of amplifier 125.

Control of the aircraft about the pitch or transverse axis is obtained from an elevator 209 carried on a shaft 208 suitably journaled in the aircraft. The elevator 209 may be operated by means of an arm 207 carried on shaft 208 which arm has its free end connected to one end of a link 210. The opposite end of link 210 is pivoted to the lower end of a manual control "stick" 214. The manual control stick 214 is carried by a shaft 212 suitably journaled in the aircraft for fore and aft movement.

Power operation of the control stick 214 is effected by cables 215 extending from an elevator cable drum 216. The cable drum 216 is carried by a shaft 221 driven by an elevator servomotor 222. The operation of servomotor 222 is controlled by an amplifier 225. Amplifier 225 has power input leads 226, 227 connected to the source of alternating voltage. Amplifier 225 has control signal input leads 228, 229 connected to an input control circuit. The direction of rotation of servomotor 222 depends upon the phase relationship between the voltage across input lead 228, 229 and the voltage across the power input leads 226, 227. The amplifier 225 and servomotor 222 may be similar to the amplifier 25, and servomotor 22 of the aileron control.

The signal control circuit of amplifier 225 constitutes a balanceable network and extends from lead 228, impedance network 230, lead 246, impedance network 247, lead 254, impedance network 256, lead 274, to ground and to grounded connection 229 of amplifier 225.

The variable impedance network 230 consists of an elevator servomotor balance potentiometer 231, an automatic recovery potentiometer 235, a voltage dividing or trimmer potentiometer 233, and a transformer 241. Potentiometer 231 has a resistor 232 whose ends are connected across the ends of a secondary winding 242 of transformer 241 and a wiper 233 which is operated through a siutable operating connection 234 from the servomotor shaft 221. Potentiometer 235 has a resistor 236 which is connected across the secondary winding 242 in parallel with the resistor 232 and a manually adjustable wiper 237. Potentiometer 238 has a resistor 239 and a manually adjustable tap 240. One end of resistor 239 is connected to wiper 233 of potentiometer 231 and the opposite end of resistor 239 is connected in series with a loading resistor 245 to a center tap 244 of secondary winding 242. Lead 228 extends to the wiper 240. Transformer 241, in addition to the secondary winding 242, includes the primary winding 43.

Variable impedance network 247 consists of a centering potentiometer 248 and a transformer 251. The potentiometer 248 has a resistor 249 whose ends are connected across a secondary winding 252 of transformer 251. The potentiometer 248 includes an adjustable wiper 250 which may be manually adjusted over the resistor 249 and may also be adjusted by a centering motor 52E similar to the centering motor 52A of the aileron control. A lead 246 extends from wiper 237 of the potentiometer 235 to a center tap of secondary winding 252. The transformer 251 in addition to the secondary winding 252 includes the primary winding 53. Variable impedance network 256 consists of a vertical gyro roll axis up elevator potentiometer 257, a voltage dividing or trimmer potentiometer 275, a variable resistor 260, a vertical gyro pitch axis potentiometer 264, and a transformer 278. Potentiometer 257 has a resistor 258 one end whereof is connected to one end of a secondary winding 279 of transformer 278. The opposite end of resistor 258 is connected in series with the variable resistor 260 to the opposite end of secondary winding 279. Potentiometer 257 includes a wiper 259 adjustable over the surface of resistor 258 by means of an operative arrangement 263 driven from the operative connection 64 extending from the vertical gyro 270. Vertical gyro 270 is of the type well known in the art having a rotor mounted for rotation about a vertical axis. The gyro 270 is similar to the gyro horizon K of United States Patent 2,190,390. The operative connection 64, like the arm 4 of the aforesaid patent, measures the bank of the aircraft. The operative arrangement 263 transmits motion from connection 64 to wiper 259 and is so constructed that irrespective of the direction of bank of the aircraft the wiper 259 is moved in the same direction or to the left in Figure 1. The potentiometer 275 consists of a resistor 277 having one end connected to wiper 259 and having its other end connected to the junction between resistor 258 and the variable resistor 260. The potentiometer 275 has a manually adjustable tap 276 which has a lead 254 extending therefrom to wiper 259 of the centering potentiometer 248. Variable resistor 260 consists of a resistor 262 and an adjustable tap 261. Potentiometer 264 consists of a resistor 265 which is connected across the secondary winding 279 of transformer 278 and an adjustable wiper 266 which may contact the surface of resistor 265 and which is driven through a suitable operating connection 269 from the vertical gyro 270. The vertical gyro 270 is so arranged in the aircraft that upon movement of the aircraft about the pitch or transverse axis the wiper 266 is displaced with respect to its resistor 265. Lead 274 extends from wiper 266 to ground. Transformer 278 consists of the secondary winding 279 and primary winding 43.

In Figure 2, there is shown apparatus which is associated with the rudder control channel of the automatic steering mechanism illustrated in Figure 1. Parts of the arrangement illustrated in Figure 2 are duplicated in the aileron and elevator control channels of Figure 1, other parts shown in Figure 2 are common to the aileron and elevator control of Figure 1, and others are associated only with the rudder control channel. The relationship of the parts of the arrangement shown in Figure 2 to these three categories mentioned will be subsequently stated.

In Figure 2, a source of D. C. voltage illustrated as a battery 388 through a two position, closed or open, master button switch 400 supplies D. C. voltage to amplifier relays 300, 310. The relays 300, 310 are contained within the amplifiers 25, 125, 225 of Figure 1 as disclosed in the aforesaid application and are alternatively operated in accordance with the phase relationship of the signal input voltage to the power input voltage. Amplifier relays 300, 310 may alternatively control a centering motor 52R or a servomotor 122 through a rudder engaged relay 320. A master engage relay 344 controls the energization of rudder engage relay 320. The energization of master engage relay 344 is controlled by a circuit including several series connected parts comprising master button switch 400, a normally closed, momentarily opened main disconnect switch 316, anti-engage relay 359, and normally open momentarily closed main engage button switch 354. The master engage relay 344 is also controlled by an automatic recovery relay 370. The automatic recovery relay 370 is controlled by a circuit including several series connected parts comprising master button 400, main disconnect switch 316, and normally open, momentarily closed automatic recovery button switch 384. A normally closed, momentarily opened rudder disconnect switch 369 controls the de-energization of rudder relay 320.

A directional gyro 55 is controlled by a caging mechanism 410. The energization of the caging mechanism 410 is controlled by a caging relay 415. The caging relay 415 is controlled alternatively by the rudder engage relay or by a turn control knob 75 through the automatic recovery relay 370. A transformer 441 is controlled by the automatic recovery relay.

With this brief statement of the interrelationship of the components of Figure 2, the details of the components will be considered. The master button switch 400 comprises two spaced contacts 402, 403 and an operable two position bridge member 401 coacting therewith. The amplifier relay 300 comprises an energizable coil 301 which is energized from a source disclosed in the aforesaid application of Willis H. Gille. The coil operates a plunger 302 carrying a switch bridge member 303 which coacts with spaced contacts 304, 305. When the relay is unoperated, the bridge member 303 does not engage the contacts 304, 305. Amplifier relay 310 includes an operating coil 311 which is energized from a source as disclosed in the aforesaid application. The coil 311 operates a plunger 312 which carries a switch bridge member 313 which coacts with spaced contacts 314, 315. When the coil 311 is unenergized, the bridge member 313 does not engage contacts 314, 315.

The centering motor 52R is a reversible D. C. motor having permanent magnet field poles 340 and a wound armature 341. Connected across the armature 341 is a center tapped resistor 342.

The servomotor 122 may be of the type disclosed in the aforesaid Gille application and such servomotor as disclosed therein is provided with brake energizing windings and clutch operating windings, the latter providing reversible rotation of the servomotor. Until the brake windings have been energized, the servomotor is not operatively associated with its control surface.

The rudder engage relay 320 includes an operating winding 321 and coacting plunger 322. The plunger 322 is operatively connected to four pivoted switch arms 323, 324, 325, and 326 which switch arms individually constitute the movable part of a single-pole double-throw switch. In normal position, the armature 322 is in the upper position as shown at which time the coil 321 is unenergized. Switch arm 323 coacts with a lower engage relay holding circuit contact 334 and with an upper caging relay contact 333. Switch arm 324 coacts with a lower, servomotor brake winding contact 332, and an upper, idle contact 331. Switch arm 325 coacts with a lower, servomotor one rotation clutch contact 330 and with an upper, one rotation centering motor contact 329. Switch arm 326 coacts with a lower, servomotor opposite rotation clutch contact 328 and an upper, opposite rotation centering motor contact 327.

Master engage relay 344 includes an operating coil 345 and a plunger 346. The plunger 346 is operatively connected to single-pole single-throw switch arms 347, 348, and 349. The switch arms 347, 348, and 349 are electrically connected to a common bus bar 350. Switch arm 347 coacts with a contact 351 which is electrically connected to a holding contact in the elevator engage relay not shown similar to contact 334 of the rudder engage relay. Switch arm 348 coacts with contact 352 which is electrically connected to a holding circuit contact for the aileron engage relay not shown similar to contact 334 in the rudder engage relay. Switch arm 349 coacts with contact 353 which is electrically connected to contact 334. In normal position the switch arms 347, 348, and 349 do not contact their respective contacts 351, 352, and 353 at which time the coil 345 is unenergized.

Main disconnect switch 316 comprises a push button operated automatically released bridge member 317 which coacts with space contacts 318, and 319.

The anti-engage relay 359 is provided with an operating coil 360 and a plunger 361 coacting therewith. The armature 361 is operatively associated with a switch arm 362 of a single-pole single-throw switch. The switch arm 362 coacts with main engage control contact 366. One end of coil 360 is connected to a bus bar having terminals 363, 364, and 365. Terminal 365 is designated the rudder centering motor contact. Terminals 364 and 363 are identified as the aileron and elevator centering motor contacts respectively.

The main engage button switch 354 comprises two space contacts 355, 356 with which coacts a manually operated automatically released bridge member 357.

The automatic recovery relay 370 is provided with an operating winding 371 and a plunger 372 coacting therewith. Plunger 372 is operatively connected to pivoted switch arms 373, 374, and 375 of three single-pole double-throw switches. Switch arm 373 coacts with a lower, automatic recovery relay holding circuit contact 381 and an upper, turn control contact 380. Switch arm 374 coacts with a lower, master engage relay contact 379 and an upper, idle contact 378. Switch arms 373 and 374 are electrically connected by a lead 382. Switch arm 375 coacts with an upper, transformer energizing contact 376 and a lower, transformer deenergizing and ground contact 377. In normal position the plunger 372 is in the upper position as shown with the coil 371 deenergized.

The automatic recovery switch comprises two spaced contacts 385, 386 and a push button operated automatically released bridge member 387 which coacts with the contacts. The rudder disconnect switch 389 may be of the push button normally closed momentarily open type and comprises spaced contacts 391, 392 and a bridge member 393 which coacts with the contacts.

The directional gyro 55 is of the type well known in the art having a rotor, not shown, supported for rotation about a horizontal axis within casing 404. The casing 404 in turn has trunnions 409 for supporting it on a horizontal axis at right angles to the spin axis of the gyro rotor. The trunnions are carried in an outer gimbal ring 405. The outer gimbal ring 405 is pivoted about a vertical axis by means of its trunnions 406, 407 which are carried by suitable bearings supported by the craft. Projecting from one end of casing 404 is an extension 408 which constitutes part of a caging mechanism to be described. The directional gyro 55 is so mounted in the aircraft that upon changes in heading of the aircraft about the yaw or vertical axis the gyro moves with respect to the craft about the vertical axis of the outer gimbal ring 405. This movement is transmitted through the operative connection 163, Figure 1 to wiper 60 of the directional gyro aileron potentiometer 58 and to wiper 162 of the directional gyro rudder potentiometer 160.

The caging mechanism 410 may consist of two alternatively energizable operating coils 411, 412 and an armature 413 which coacts therewith. The armature 413 carries at one extremity a hollow conical shaped member 414 which may be engaged with the projection 408 of gyro casing 404. The armature 413 is supported for longitudinal movement by any suitable means not shown. The coil 412 is designated the caging coil and the coil 411 the uncaging coil. Upon the energization of coil 412 the armature 413 is moved to engage the conical shaped member 414 with the projection 408 whereby the gyro rotor is centered and caged. Upon the operation of coil 411 the armature 413 is moved to disengage the cone 414 from the projection 408.

The caging relay 415 consists of an operating coil 416 and a plunger 417 coacting therewith. The plunger 417 is operatively connected to a switch arm 418 of a single-pole double-throw switch. When the master button switch 409 is unoperated as shown, the switch arm 418 of the caging relay is in the lower position when the coil 416 is unenergized. Switch arm 418 coacts with a lower, uncage contact 420 and an upper caging contact 419.

The turn control knob 75, in addition to operating the wiper 74 of the network 70, Figure 1, also operates a switch arm 423 of a switch 422. Switch 422 includes two spaced contacts 424, 425 which may be pivoted at their lower ends and are electrically connected together. The switch arm 423 is interposed between the spaced contacts 424, 425. A transformer 441 is provided with a primary winding 53 and several secondary windings 52, 152, 252, and 78 as shown.

While features pertaining to the rudder control only have been illustrated in Figure 2, it is to be understood that the servomotor, centering motor, the individual disconnect switch, the amplifier relays, and the individual engage relay are duplicated in the aileron control channel and in the elevator control channel. The features illustrated in Figure 2 which are common to the aileron, rudder, and elevator channels are the main engage switch 354, the master engage relay 344, the automatic recovery switch 384, the automatic recovery relay 370, the main disconnect switch 316, the master button switch 409, and the anti-engage relay 359. The features shown in Figure 2 which are confined solely to the rudder control channel are associated with the caging contact 333 of the rudder engage relay 320. In the aileron and elevator engage relays, the contacts corresponding with contact 333 of the rudder engage relay 320 are idle. In other words, the rudder engage relay 320 is the only relay of this type which controls the caging relay 415 and the caging mechanism 410.

Operation

Having described in detail the component parts of the automatic steering mechanism and their interrelationship, the operation of the steering system wil lbe described. It is now apparent that the aileron, rudder, and elevator control channels of Figure 1 each include an amplifier which is controlled by a network. Referring to the rudder control channel of Figure 1, the control network as stated is made up of variable impedance networks 130, 147, 155, a portion of network 57 modified, and network 70. In network 130 if wiper 133 is at the electrical center of resistor 132 and wiper 137 is at the electrical center of resistor 136, wiper 133 and wiper 137 are at the same potential and no signal will therefore be generated in network 130. In network 147 if wiper 150 be at the electrical center of resistor 149 there will be no potential difference between wiper 150 and the center tap of secondary winding 152, therefore network 147 will not generate any output signal voltage. Similarly, in network 155 if wiper 158 is at the electrical center of resistor 157 and wiper 162 is at the electrical center of resistor 161 wipers 158 and 162 will be at the same potential and network 155 will not generate a signal. In network 57, if wiper 63 be at the electrical center of resistor 62, the wiper 63 will be at the same potential as center tap 67 of secondary winding 66 and no signal voltage will be supplied to the potential divider 176 and therefore the rudder control network will not be supplied with a signal voltage from network 57. Similarly, if the turn control operated wiper 74 be at the electrical center of resistor 73 the wiper 74 will be at the potential of the center tap of secondary winding 76 and therefore the turn control potentiometer 70 will not generate a signal voltage. Since it is evident that the various impedance networks recited are connected in series and since they do not generate signal voltages under the conditions described, the input circuit of amplifier 125 is in balanced condition.

The rudder control network may become unbalanced due to the change in attitude of the aircraft about its axes. For example, if the aircraft changes position about its yaw or vertical axis, the directional gyro 55 through the operating connection 163 will adjust wiper 162 with respect to resistor 161 resulting in a signal voltage being generated in network 155 to cause unbalance of the input circuit of amplifier 125. Also, if the aircraft moves about its longitudinal or roll axis, the vertical gyro 270 will respond to this movement and through the operating connection 64 will adjust the wiper 63 with respect to resistor 62. This movement of wiper 63 will change its potential with respect to center tap 67 of secondary winding 66. The potential difference between the wiper 63 and center tap 67 will be applied across the voltage dividing resistor 177 and tap 178 may be positioned to select any desired portion of this potential difference. The input circuit of amplifier 125 is thus also unbalanced upon movement of the aircraft about the roll axis.

The rudder control network is rebalanced automatically by controlling alternatively two networks 130 or 147. When the automatic steering control system is not controlling the aircraft, the rudder control network is automatically balanced by the operation of centering motor 52R. When the automatic steering mechanism is not controlling the aircraft as stated, the rudder engage relay 320 is in the position shown in Figure 2. If the rudder control network be now unbalanced the amplifier 125 will operate to cause the operation of either relay 300 or relay 310. If amplifier relay 300 be operated due to the unbalance of the network of amplifier 125, a circuit is completed from battery 388, operated master button 400, lead 442, contact 305, bridge member 303, contact 304, switch arm 326, contact 327, through reversible steering motor 52R, resistor 342, lead 443, anti-engage relay coil 360, to ground and to the grounded side of battery 388. The steering motor 52R operates the wiper 150 of the centering potentiometer 148 until the rudder input circuit network is in balanced condition. As long as the input circuit is unbalanced, the centering motor 52R will continue to operate and the anti-engage relay 359 will be energized to disengage switch arm 362 from its contact 366.

In the elevator control channel and the aileron control channel, the balanceable networks controlling respectively amplifiers 225 and 25 operate in a manner similar to that for amplifier 125 described. Since the elevator and aileron centering motors complete their circuits through terminals 363 and 364 and coil 360 of the anti-engage relay, it is evident that the switch arm 362 is disengaged from contact 366 as long as either of the three control channels are in unbalanced condition.

The aircraft may now be conditioned for the attitude it is to assume on automatic recovery. The aircraft, for this purpose, may be manually operated until it is in the desired attitude. The automatic recovery button 387 may now be operated to bridge contacts 385, 386. A circuit will now be completed from battery 388, master button 400, main bus bar 444, main disconnect switch 317, lead 445, automatic recovery switch 384, lead 446, automatic recovery relay winding 371 to ground and to battery ground 448. Operation of the automatic recovery relay 370 energizes the master engage relay 344 from a circuit extending from battery 388, master button 400, main bus 444, main disconnect 317, lead 445, lead 449, switch arm 373, lead 392, switch arm 374, contact 379, lead 450, lead 451, winding 345 of relay 344 to ground and to battery ground 448. A holding circuit for winding 371 of the automatic recovery relay 370 is also completed from energized lead 449, switch arm 373, contact 381, winding 371, to ground and to battery ground 448. The operation of the automatic recovery relay 370 also disconnects the primary winding 53 of transformer 441 from its energizing circuit comprising lead 453, contact 376, switch arm 375, and causes the input side of primary winding 53 to be connected to ground through switch arm 375, and contact 377 whereby the transformer 441 is deenergized. The secondary windings associated with transformer 441 therefore are no longer energized.

The operation of the master engage relay 344 causes the switch arms 349, 348 and 347 to engage their respective contacts. A circuit is now completed from energized lead 445, lead 452, bus bar 350, switch arm 349, contact 353, lead 454, relay winding 321, rudder disconnect switch 389, to ground and to battery ground 448. The rudder engage relay 320 is thus energized. A similar circuit as is now evident is provided for the aileron and elevator engage relays.

The operation of the rudder engage relay 320 causes the switch arms 323, 324, 325, and 326 thereof to engage their lower contacts. A holding circuit for coil 321 is now provided from energized lead 452, switch arm 323, contact 334, coil 321, rudder disconnect switch 389, to ground and to battery ground 448. The disconnection of switch arm 323 from contact 333 deenergizes the caging relay 415 whereupon the armature 417 moves to the position shown wherein switch arm 418 engages contact 420. The caging mechanism 410 is thereby energized to uncage the directional gyro. The circuit for energizing the caging mechanism extending from energized lead 445, lead 455, switch arm 418, contact 420, to the uncaging coil 411, to ground and to battery ground 448.

The engagement of switch arm 324 with lower contact 332 of the rudder engage relay 320 completes a circuit through a lead similar to lead 182, Figure 2, of the aforesaid Gille application to energize the brake windings 460, 461 to place the rudder servomotor 122 in braked condition with respect to the rudder of the aircraft whereby said servomotor is associated with said rudder. The engagement of switch arm 325 with its lower contact 330 joins the rudder amplifier relay 310 with one clutch coil 462 of the rudder servo 122 corresponding with electromagnet 164 in the aforesaid application to permit operation of said servo. The engagement of switch arm 326 with its lower contact 328 joins the amplifier relay 300 with the other clutch coil 463 of servo 122 corresponding to electromagnet 144 as disclosed in the aforesaid application of Willis H. Gille.

In a similar manner the operation of the aileron and elevator engage relays corresponding to rudder engage relay 320 associates the aileron and elevator amplifier relays with their respective servomotors and disassociates the relays from the centering motor. Similarly a holding circuit is provided for the aileron and elevator relay.

It is evident that the elevator, aileron, and rudder control surfaces have now been associated with their operating servomotors in braked position and the craft is in a condition for automatic control. Should the aircraft change its attitude from that in which it was placed prior to the operation of the automatic recovery button 387, the attitude with respect to each axis may be regained by the manual adjustment of the individual automatic recovery potentiometers 35, 135, and 235.

With the aircraft again in its desired attitude, the automatic control may be disassociated from the control surfaces by the operation of the main disconnect switch button 317 to open the circuit across the contacts 318, 319. The operation of the main disconnect button 317 will deenergize the automatic recovery relay winding 371 and the master engage relay winding 345 and the rudder, aileron, and elevator relays to transfer the rebalancing of the aileron, rudder, and elevator networks from the servomotor rebalancing potentiometers 31, 131, and 231 to the centering potentiometers 48, 148 and 248.

Having established a desired attitude of the aircraft for automatic recovery the aircraft may be manually or automatically controlled to fly as desired. The operation of the automatic recovery arrangement will be considered when the pilot desires that the aircraft regain a predetermined attitude from which it had departed through the operation of the control surfaces manually. When the pilot manually effects changes in the attitude of the aircraft about the roll and pitch axes, the vertical gyro responds as stated to such changes and operates wiper 63 of potentiometer 61 in network 57, wiper 259 of the up-elevator potentiometer 257, and wiper 266 of the pitch axis potentiometer 264 whereby the aileron, rudder, and elevator networks are unbalanced. As described previously, the centering motors respectively maintain their networks in a balanced condition when the plane is manually flown.

When the pilot wishes to regain the desired attitude of the aircraft while under manual control, he operates the automatic recovery button 387 which associates the respective servomotors with their control surfaces and places the servomotor under control of its amplifier. The opening of the circuit to primary winding 53 of transformer 441 disables centering potentiometers 48, 148 and 248, the now unoperated turn control potentiometer 72 with respect to supplying a control signal in their respective networks.

The datum or base for each control network now changes from the centering potentiometers in each network to the automatic recovery potentiometers in the respective networks. This change in the base or datum from the centering potentiometers to the automatic recovery potentiometers in the several networks causes a signal to be applied to their amplifiers when the plane is in the attitude achieved by manual control. For example, if the aircraft is in a banked turn, the vertical gyro 270 will have provided a signal in the aileron, rudder, and elevator control networks which will have been balanced by the centering potentiometers. The change from the centering potentiometer base to the automatic recovery potentiometer base results in a vertical gyro signal in each network which is unbalanced.

The amplifiers 25, 125, and 225 operate in response to this vertical gyro signal and cause the aileron, rudder, and elevator servomotors to operate their control surfaces and also operate their follow up wipers 33, 133, and 233 to rebalance the several networks. The control surfaces are moved in such a direction as to correct for the condition which resulted in the vertical gyro signal. As the aircraft moves toward its desired attitude, the vertical gyro signal decreases resulting in an unbalance of the several networks in the opposite direction so that the amount of control surface displacement is decreased. When the signal from vertical gyro 270 is reduced to zero at which time the aircraft has regained its desired attitude the control surfaces have been moved back to their normal position.

The directional gyro 55 and the rate gyro 159 will also have functioned following the operation of the automatic recovery button 387 to maintain the aircraft on the heading it had attained when the automatic recovery button was operated. The aircraft will now be automatically maintained in its desired attitude on the heading stated.

The operation of the automatic recovery arrangement will also be considered when the pilot desires that the aircraft regain the desired attitude from an attitude that the plane has achieved by operation of the automatic steering mechanism from a manual control which operates through said steering mechanism. For the purpose of manually controlling changes in attitude of the aircraft through the automatic steering mechanism there is provided the turn control potentiometer 72 and its operating knob 75. For automatic control, the automatic steering mechanism is associated with the control surfaces by the operation of the engage button 357. Operation of the main engage button 357 completes a circuit from battery 383, master button 400, main bus 444, main disconnect 317, lead 445, contact 366 of the anti-engage relay 359, switch arm 362, lead 456, main engage switch 354, lead 451, relay winding 345, to ground and to battery ground 448. The operation of the master engage relay 345 effects the operation of the individual rudder, aileron and elevator engage relays to energize the servomotor brakes and to associate the amplifier of each channel with its respective servomotor.

If the pilot wishes to turn the aircraft to the right, he operates the turn control knob 75 to move wiper 74 with respect to its resistor 73 whereby a signal is generated in network 70 which is applied directly to the aileron amplifier 25. This signal is also applied from network 70 through potentiometer 176 to the rudder amplifier 125 causing the unbalance of the aileron and rudder amplifier networks. In response to this unbalance the respective amplifiers cause the operation of their servomotors whereby the ailerons and rudder are positioned and the follow up or rebalancing wipers 33 and 133 are respectively positioned to again balance the networks. The turn control knob 75 will also have caused the switch arm 423, Figure 2, to engage one or the other contacts 424, 425 whereby the circuit is completed from energized lead 445, lead 449, switch arm 373, contact 380, lead 457, arm 423, contact 424, or 425, caging relay coil 416, to ground and to battery ground 448.

The operation of the caging relay 415 energizes the caging coil 412 of the caging mechanism whereby the directional gyro is centered and caged. With the gyro caged the wiper 60 of the directional gyro aileron potentiometer 58 and the directional gyro rudder potentiometer 160 are unoperated. Under the applied ailerons and rudder the aircraft banks and turns. In response to the banking of the aircraft the vertical gyro 270 through its operating connection 64 will unbalance the elevator network by the operation of wiper 259 and will also unbalance the aileron and rudder networks by the operation of wiper 63 of the vertical gyro banking potentiometer 61. The signals from the vertical gyro as thus provided cause the aileron and rudder networks to become unbalanced whereby the aileron and rudder are moved back toward their normal position and the elevator network is unbalanced so that a slight amount of up elevator is applied. The aircraft will now continue in its banked turn unless the turn control knob 75 is restored to its original position.

Should the pilot desire that the plane be automatically returned to its original desired attitude he need merely to push without precise movement the automatic recovery button 387. When the automatic steering mechanism is associated with the control surfaces, the operation stated of the automatic recovery button 387 merely disconnects the primary winding 53 of transformer 441 from its supply and connects it to ground to deenergize the same and opens the circuit at contact 380 and switch arm 373 for the caging coil 412. Other functions of the recovery relay had been effected by the main engage relay. The disengagement of switch arm 373 from contact 380 opens the circuit to caging relay 415 whereby the armature 417 moves to its position shown completing a circuit through the uncaging coil 411 of caging mechanism 410.

Since the secondary winding 78 of the operated turn control potentiometer and the windings 52, 152, 252 for the centering potentiometers are now no longer energized, the centering potentiometer and the turn control potentiometer do not supply any control signal.

With the control signal from the turn control potentiometer 70 no longer present in the aileron and rudder networks, they are unbalanced. The unbalance present in these aileron and rudder networks due to the signal from the vertical gyro 270 because of the banked attitude causes the rudder and aileron amplifier to operate their servomotors. This operation is such as to move the ailerons and rudder in an opposite direction from that in which they were originally positioned.

The amount of the bank of the aircraft decreases, and the vertical gyro 270 in response to the decrease in bank moves wipers 259 of the up elevator potentiometer 257 and wiper 63 of the vertical gyro bank potentiometer back to their normal position. This results in unbalance of the aileron and rudder amplifier networks whereby the ailerons and rudder are moved back toward their normal position. In addition, the elevator network has become unbalanced by the operation of wiper 259 toward normal position and the elevator is moved back toward its normal position.

The operation is continuous in that in response to a decrease in bank the vertical gyro causes the control surfaces to be moved back to their normal position which is determined by the original attitude of the plane as governed by the automatic recovery potentiometers. When the aircraft has regained level position the potentiometer wipers 63 and 259 are in their normal position as determined by the attitude set up by the automatic recovery potentiometers. The aircraft is stabilized in this position by the vertical gyro and the heading of the aircraft is maintained by the directional gyro 55 and the rate gyro 159.

It will be appreciated that in providing a single button control such as the automatic recovery button 387 which may be operated to regain the desired attitude of the aircraft that such control will have a direct appeal to the pilot.

Under manual operation of the controls, he may find himself in a cloud and unable to judge his attitude. Similarly, for other reasons, he is uncertain as to the proper manual operation of the control surfaces to regain a desired attitude. Operation of the button 387 however will automatically restore the aircraft to a preselected attitude.

On the other hand under automatic control with the turn control operated, his vision may have become impaired making him confused as to the manner in which the turn control knob 75 ought to be operated or to its extent of operation in order to right the aircraft. The operator of the push button 387 need not contemplate its extent or direction of adjustment which would be involved should he be required to operate the turn control knob 75 in bringing the aircraft back to its desired attitude. Such lack of precise operation required of the automatic recovery button 387 as compared with the precise operation of the turn control knob 75 in order to regain the desired attitude of the aircraft is especially desirable where the pilot feels that he may become incapacitated from any cause as stated.

It is now apparent that I have provided a novel automatic steering mechanism which includes a single manually operable controller which may be operated in no particularly determinate manner to effect restoration of the aircraft to a desirable attitude and on stabilized heading irrespective of the attitude in which the craft may have been placed. The aircraft may have been placed in an attitude from which it is desired to be changed either by manual operation of the control surfaces or manual control through the automatic pilot of the control surfaces.

While I have disclosed my invention as embodied in one form of apparatus, it is apparent to those skilled in the art that other embodiments thereof may be provided. I, therefore, do not wish to restrict myself to the exact embodiment disclosed but only as defined by the appended claims.

I claim as my invention:

1. Control apparatus for an aircraft having control surfaces for controlling said aircraft about three respectively perpendicular axes and manually operable means for positioning said control surfaces, said apparatus comprising: a power means adapted for association with and for operating each axis control surface; a balanceable control means for each power means, each control means including a plurality of signal generators and a signal combining means; attitude responsive means movable from a normal position about one of said axes to operate a first signal generator in all of said control means; a second signal generator in each control means; positioning means for each second signal generator operated by each said control means while said respective power means is disassociated from its control surface to maintain said control means in balanced condition during attitude changes while the control surfaces may be manually operated; means for associating each power means with its respective control surface to maintain the existing position of the aircraft irrespective of its attitude; a follow up third signal generator in each control means operated by each power means; and means for rendering ineffective each second signal generator in its operated position to thereby render each control means subservient to its first signal generator and return the craft to the normal position.

2. Control apparatus for an aircraft having a control surface said apparatus comprising: control surface power means adapted for association with said control surface; control means for said power means, said control means including a balanceable electrical system having adjustable control devices for affecting its balance; attitude means for adjusting one control device; means operated by said control means while said power means is disassociated from said control surface for adjusting a second control device to rebalance said system to balance said electrical system during changes in the attitude of said aircraft; means for preventing the associating of said power means until said system is rebalanced by said second control device with said devices continuing to have effect on said electrical system; and means for associating said power means with said control surface irrespective of the balance of said electrical system and for rendering said second control device ineffective to affect said balance in its adjusted position.

3. Control apparatus for an aircraft having a manually or automatically operable control surface said apparatus comprising: power means which may be associated with said control surface; control means which may be associated with said power means and including a balanceable network having a plurality of signal generating devices; means responsive to the attitude of the aircraft about an axis for operating one generating device; means driven by said power means for operating a second generating device; means for operating a third adjustable device in said network to balance said network during craft attitude changes with manual operation of said surface; operable means controlled by said network for associating said control means with said power means and for associating said power means with said control surface only when said network is balanced with said network effectively comprising said three generating devices; and further operable means for rendering said third generating device ineffective in said network and associating said control means with said power means and said power means with said control surface irrespective of the unbalance of said network.

4. Control apparatus for an aircraft having a control surface for controlling the attitude of said craft about an axis, said apparatus comprising: manual means for operating directly said control surface; servo means for alternatively automatically operating said control surface; voltage responsive control means; a network comprising a plurality of voltage producing devices for controlling said voltage responsive means; operating connections from said servo means to one of said devices for adjusting the same; motor means for adjusting a second of said devices; attitude means for adjusting a third of said devices; means for controlling said motor means from said voltage responsive means during manual operation of said control surface; means for transferring control by said potential responsive means from said motor means to said servo means; manually operable means for adjusting a fourth of said devices for changing the attitude of said craft about said axis during automatic operation; and means for rendering said manually operable device and said motor operated device ineffective in said network whereby the attitude of said craft conforms to the position of said attitude means.

5. Control apparatus for an aircraft having a manually or automatically adjustable control surface for controlling the attitude of the aircraft about an axis, said apparatus comprising: servo means adapted to be operatively connected with said control surface; voltage responsive control means including a network having a plurality of voltage producing devices connected in series; means responsive to movement of the aircraft about said axis for adjusting a first voltage producing device; manual means for adjusting a second voltage producing device in said network to select an attitude about said axis to be maintained automatically; motor means normally connected to said voltage responsive means being controlled thereby and adjusting a third voltage producing device in said network to maintain electrical balance in said network during craft attitude changes with said surface manually adjustable; and means for shifting connections of said control means from said motor means to said servo means and for associating said servo means with said control surface to automatically maintain craft attitude as determined by said three devices; and further means for rendering said motor operated voltage producing device and said manually operable voltage producing device ineffective in their adjusted positions in said network whereby said responsive means through said network solely determines the attitude of said craft.

6. Control apparatus for an aircraft having a control surface and manually operable means for positioning said control surface to change the attitude of said craft from datum about one axis, said apparatus comprising: surface power means normally disassociated from said surface but which may be associated with said control surface; operable control means for said power means including a balanceable electrical network having a plurality of signal producing devices each having two relatively movable parts for producing voltage signals proportional to the relative movement, for affecting the balance of said network, said network on unbalance causing control means operation; means responsive to the change in attitude of said aircraft from a datum about said axis for relatively moving the two parts of a first control device in proportion to the magnitude of change in attitude to unbalance said network; a synchronizing motor operated by said control means while said power means is disassociated from said control surface to relatively move the parts of a second control device to rebalance said network to terminate control means operation; means for relatively moving the parts of a third control device by said power means; apparatus engaging means for associating said power means with said control surface and also with said control means while said network is balanced to maintain thereafter said aircraft in said changed attitude as determined by the previous relative movement of the two parts of the second control device; and attitude changing means including disabling means for rendering said second control device with its two parts remaining relatively displaced ineffective in said network but with said power means associated with said control surface, to cause the network to be unaffected by the previous change in attitude to thereby restore said aircraft to datum under the supervision of the first control device.

WILLIAM J. McGOLDRICK.

References Cited in the file of this patent

UNITED STATES PATENTS

| Number | Name | Date |
|---|---|---|
| 2,439,750 | Nisbet et al. | Apr. 13, 1948 |
| 2,464,629 | Young | Mar. 15, 1949 |
| 2,466,702 | Hamby | Apr. 12, 1949 |
| 2,516,641 | Murphy | July 25, 1950 |
| 2,516,796 | Noxon et al. | July 25, 1950 |
| 2,570,905 | Young et al. | Oct. 9, 1951 |